United States Patent [19]

Suenaga et al.

[11] Patent Number: 4,807,728
[45] Date of Patent: Feb. 28, 1989

[54] BRAKE MEMBER AND METHOD OF MANUFACTURING SAME

[75] Inventors: Makoto Suenaga; Fumio Obata, both of Kitakyushu, Japan

[73] Assignee: Hitachi Metals, Ltd., Japan

[21] Appl. No.: 26,750

[22] Filed: Mar. 17, 1987

[30] Foreign Application Priority Data

Mar. 20, 1986 [JP] Japan .................................. 61-62175
Apr. 23, 1986 [JP] Japan .................................. 61-93691

[51] Int. Cl.⁴ ...................... F16D 65/02; F16D 65/12; B22D 19/00
[52] U.S. Cl. ...................................... 188/260; 164/99; 188/73.1; 188/218 R; 188/218 X L; 188/250 R; 188/255
[58] Field of Search .................. 188/218 R, 218 X L, 188/218 A, 73.1, 73.2, 73.31, 250 R, 251 R, 251 A, 251 M, 255, 260, 256, 257, 250; 164/98, 99

[56] References Cited

U.S. PATENT DOCUMENTS

Re. 5,716 12/1873 Sax ........................................ 164/99

FOREIGN PATENT DOCUMENTS 56-93851 9/1981 Japan .
57-9852 1/1982 Japan .
59-45073 3/1984 Japan .
421794 12/1934 United Kingdom ............ 188/218 R
436202 10/1935 United Kingdom ............ 188/218 R Primary Examiner—Andres Kashnikow
Assistant Examiner—Matthew C. Graham
Attorney, Agent, or Firm—Finnegan, Henderson, Farabow, Garrett & Dunner

[57] ABSTRACT

A brake member integrally cast from a single melt and composed of a sliding portion and a hub portion, the sliding portion having a flaky graphite cast iron microstructure with a good damping capacity and the hub portion having a high-strength cast iron microstructure. The sliding portion which may be a drum or a rotor has a damping capacity $Q^{-1}$ of higher than $16 \times 10^{-3}$. It is manufactured by pouring a melt having a hyper-eutectic flaky graphite cast iron composition into a cavity of a sand mold in which a chiller is embedded adjacent to a cavity region for the hub portion.

16 Claims, 7 Drawing Sheets

BRAKE MEMBER AND METHOD OF MANUFACTURING SAME

BACKGROUND OF THE INVENTION

The present invention relates to a brake member for automobiles such as a brake drum and a brake rotor, and also to a method of manufacturing the same.

Figure 1:
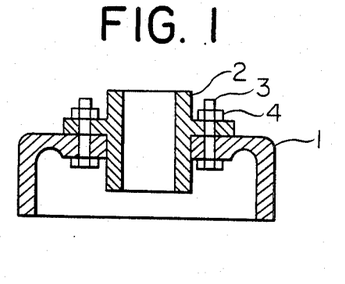
FIG. 1 is a cross-sectional view of a brake drum bolted to a hub according to one embodiment of the present invention.
Figure 2:
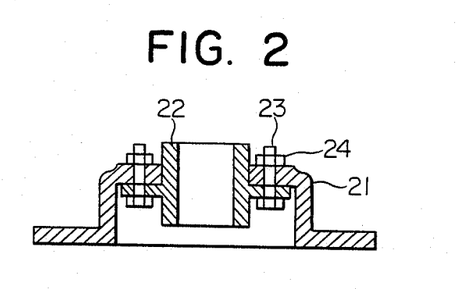
FIG. 2 is a cross-sectional view of a brake rotor bolted to a hub according to another embodiment of the present invention.

Widely used as brake members for automobiles are brake drums and brake rotors. Typical examples of the brake drums and the brake rotors are shown in FIGS. 1 and 2. In FIG. 1, a drum 1 is fixed to a hub 2 with a plurality of bolts 3 and nuts 4. The same is true of FIG. 2, in which a rotor 21 is fixed to a hub 22 with a plurality of bolts 23 and nuts 24. The drum 1 and the rotor 21 are required to have good braking properties such as wear resistance, damping capacity and heat conductivity. Accordingly, they are usually made of flaky graphite cast iron such as FC25. On the other hand, since the hubs 2, 22 are required to have good mechanical strength and toughness, they are usually made of spheroidal graphite cast iron such as FCD50.

Thus, conventionally used for brake members are a combination of a drum or a rotor made of flaky graphite cast iron and a hub made of spheroidal graphite cast iron, fixed together with bolts.

Various attempts have recently been made to provide an integral brake member consisting of a disc or rotor portion with good wear and damping properties and a hub portion with good mechanical properties.

Japanese Patent Laid-Open No. 56-93851 discloses a disc brake rotor consisting of a disc portion made of flaky graphite cast iron and a boss portion made of spheroidal graphite cast iron. This disc brake rotor is produced from a single melt having a graphite flake cast iron composition. A spheroidizing material such as Mg, Ca and their alloys is placed in a cavity of a mold at such positions that the melt poured into the cavity can flow while in contact therewith into an area corresponding to the boss portion of the disc brake rotor. Therefore, the boss portion has a microstructure of spheroidal graphite cast iron.

Japanese Patent Laid-Open No. 57-9852 discloses a cast iron product such as a disc brake rotor and a brake drum for automobiles having spheroidal graphite distributed in a particular portion and compacted/vermicular graphite in the other portion. In this case too, a spheroidizing material is placed in a mold cavity near a portion which is to be formed with compound/vermicular graphite cast iron. Since the compacted/vermicular graphite cast iron has good mechanical properties, it is used for forming a hub portion of the disc brake rotor.

In both of the above prior art, however, the use of a spheroidizing material does not always ensure the formation of spheroidal graphite cast iron or C/V graphite cast iron in the desired portion, because mere contact of the spheroidizing material with the cast iron melt flowing thereover is not enough to provide full mixing thereof. Thus, mechanical strength may vary widely for the hub portions produced by contact of the spheroidizing material with the cast iron melt in a mold cavity, which means that these technologies using the spheroidizing material are unable to provide high-quality brake drums and rotors for sure.

Japanese Patent Laid-Open No. 59-45073 discloses a wheel hub integrally provided with a brake drum. The hub portion is formed from a spheroidal graphite cast iron melt while the drum portion is from a gray cast iron melt. Since this technology does not use a spheroidizing material placed in a mold cavity, the resulting wheel hub appears to have a good quality. However, to fuse the two portions integrally in a mold cavity, two melts having different compositions should be poured into the cavity through two runners, and the mold should have a means for detecting whether or not a first melt fills a predetermined area in the cavity. Accordingly, a mold for providing this wheel hub inevitably has a complicated structure, and a method of producing the wheel hub by such mold is also inevitably difficult and costly.

And recently, consumers have been requesting increasingly higher braking characteristics. Among other things, good damping capacity for preventing a braking noise, so-called "squealing" is strongly desired. By recent demand of consumers, flaky graphite cast iron such as FC25 is found lacking with respect to damping capacity.

OBJECT AND SUMMARY OF THE INVENTION

An object of the present invention is, therefore, to provide a brake member integrally composed of a rotor or drum portion with a good damping capacity and a hub portion with good mechanical strength.

Another object of the present invention is to provide a method of manufacturing such brake member from a single melt.

A further object of the present invention is to provide a method of heat-treating such brake member to improve the properties of the rotor or drum portion and of the hub portion.

Intense research in view of the above objects has revealed that pouring a melt of a hyper-eutectic flaky graphite cast iron composition into a mold cavity having a chiller placed in a particular portion can provide an integrally cast brake member composed of a rotor or drum portion and a hub portion both having good proprties. The present invention has been made based on this finding.

That is, the brake member according to the present invention is integrally cast from a single melt and composed of a sliding portion and a hub portion, the sliding portion having a flaky graphite cast iron microstructure with a good damping capacity and the hub portion having a high-strength cast iron microstructure.

The method of manufacturing such brake member according to the present invention comprises the step of pouring a melt having a hyper-eutectic flaky graphite cast iron composition into a cavity of a sand mold in which a chiller is embedded adjacent to a cavity region for the hub portion.

DETAILED DESCRIPTION OF THE INVENTION

One of the important features of the present invention is that a hyper-eutectic flaky graphite cast iron melt is used as a single melt for producing a brake member integrally composed of a sliding portion and a hub portion. The hyper-eutectic flaky graphite cast iron may be defined as flaky graphite cast iron having equivalent carbon ($CE = C(\%) + \frac{1}{3}Si(\%)$) of greater than 4.3%. It has been found that the larger the equivalent carbon, the higher damping capacity $Q^{-1}$ the brake member made of flaky graphite cast iron has. This damping capacity is a measure of how much the brake member is likely to cause braking noise which may be called "squealing." FIG. 5 shows the relation between the CE value and the damping capacity, and Table 1 shows the relation between the damping capacity and the possibility of squealing.

TABLE 1

| Possibility of Squealing | 13% | 6% | 0% |
|---|---|---|---|
| $Q^{-1}$ Value of Test Piece | $8 \times 10^{-3}$ | $13 \times 10^{-3}$ | $>16 \times 10^{-3}$ |

Figure 5:
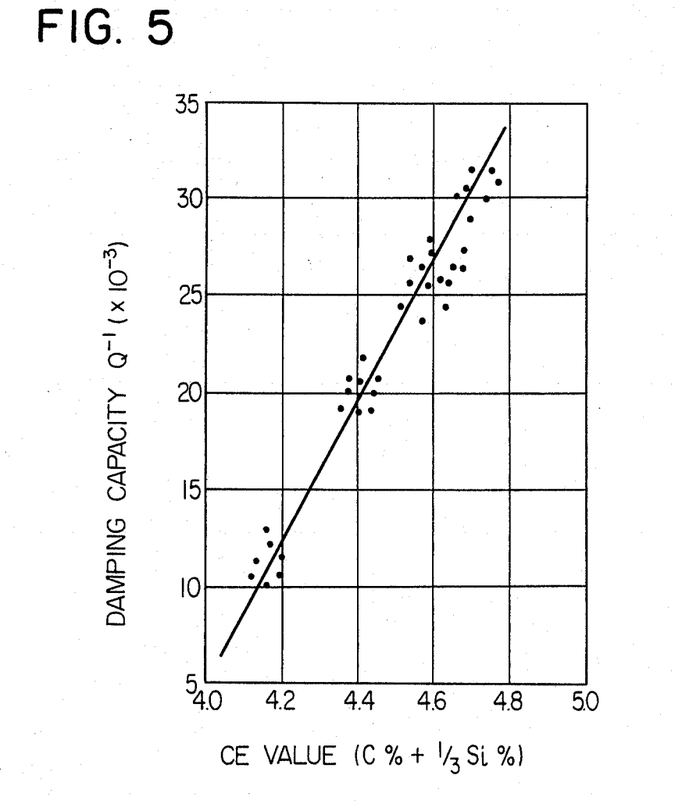
FIG. 5 is a graph showing the relation between a damping capacity and an equivalent carbon value.

A combination of FIG. 5 and Table 1 shows that the hyper-eutectic flaky graphite cast iron having the CE value of greater than 4.3% can substantially eliminate the possibility of squealing. Namely, total elimination of squealing requires that a drum or disc portion of the brake member be made of hyper-eutectic flaky graphite cast iron having the damping capacity of higher than $16 \times 10^{-3}$. It is noted that flaky graphite cast iron such as FC25 fails to meet this requirement of the damping capacity.

A main factor governing the damping characteristic of the cast iron is the shape and amount of graphite. With respect to shape, graphite flake is most effective for increasing the damping capacity, and with respect to amount, the graphite should occupy more than about 15% of the total area of the matrix to satisfy the $Q^{-1}$ value of higher than $16 \times 10^{-3}$. This area rate of graphite greater than 15% is provided by the CE value higher than a eutectic point. Thus, the CE value is used herein to evaluate the damping capacity of the resulting cast iron.

The hyper-eutectic flaky graphite cast iron used in the present invention has a composition of 3.50–4.20% of C, 1.00–3.00% of Si, 0.30–0.80% of Mn, less than 0.10% of P, less than 0.12% of S, 0.01–0.08% of Cr, 0.20–0.80% of Cu and balance Fe and inevitable impurities on a weight basis. When the amount of C is relatively small within the above range, an inoculant such as Ca-Si is used in an amount of 0.10–0.50 weight %.

Figure 3:
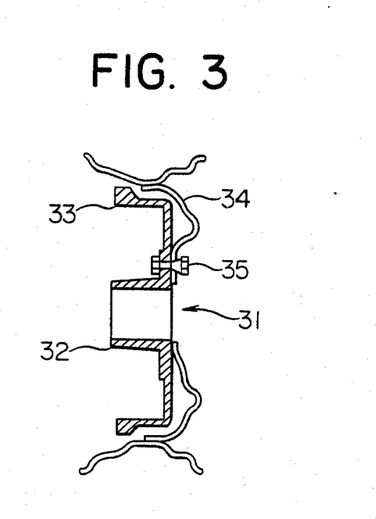
FIG. 3 is a cross-sectional view of a brake drum bolted to a wheel according to a further embodiment of the present invention.

FIGS. 1–4 show typical examples of the brake member of the present invention. FIGS. 1 and 3 show brake drums and FIGS. 2 and 4 brake rotors. Also, in FIGS. 1 and 2, the brake member 1, 21 is bolted to the hub 2, 22, and in FIGS. 3 and 4, the hub portion 32, 42 is integral with the drum portion 33 or the rotor portion 43. In any case, those portions to be bolted to the hub or the wheel, which are called summarily "hub portions" herein, should have good mechanical properties such as mechanical strength and toughness. On the other hand, those portions to be brought into sliding contact with a brake shoe or pad and stopped thereby, such as a drum or disc portion, which are called summarily "sliding portions" herein, should have a good damping capacity and wear resistance.

Figure 6:
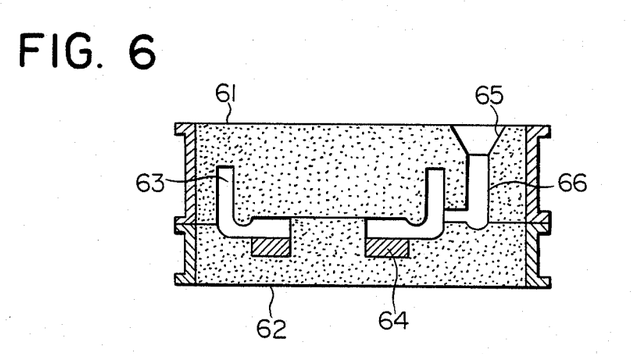
FIG. 6 is a cross-sectional view of a sand mold having a chiller embedded therein for producing a brake drum according to one embodiment of the present invention.

FIG. 6 shows a sand mold for producing a brake drum typically indicated by FIG. 1. The sand mold consists of an upper mold part 61 and a lower mold part 62 each having a recess which forms a cavity 63 when combined. An annular chiller 64 is embedded in the lower mold part 62 near a cavity area for the hub portion of the brake drum to be produced. The cavity is provided with an opening 65 and a runner 66.

Figure 7:
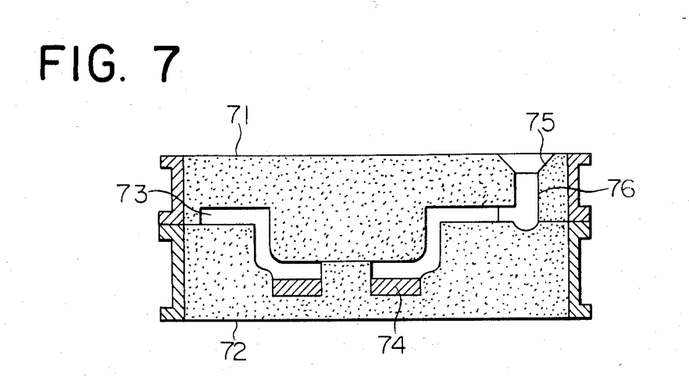
FIG. 7 is a cross-sectional view of a sand mold having a chiller embedded therein for producing a brake rotor according to another embodiment of the present invention.

FIG. 7 shows a sand mold for producing a brake rotor typically indicated by FIG. 2. Similar to the sand for producing the brake member mold of FIG. 1, this sand mold consists of an upper mold part 71 and a lower mold part 72 having an annular chiller embedded therein near a cavity area for the hub portion. A cavity 73 is provided with an opening 75 and a runner 76.

Figure 8:
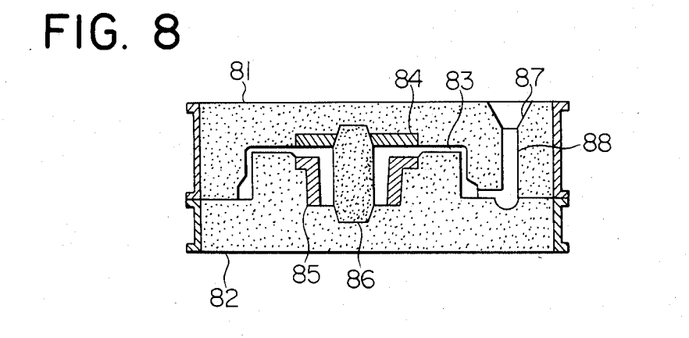
FIG. 8 is a cross-sectional view of a sand mold having chillers embedded therein for producing a brake drum according to a further embodiment of the present invention.

FIG. 8 shows a sand mold for producing a brake drum typically indicated by FIG. 3. Since this brake drum is integrally composed of a drum portion and a hub portion, a core 86 is placed in a cavity 83, and a central cavity area is enclosed by chillers 84, 85 embedded in the sand mold. Similarly, the cavity 83 is provided with an opening 87 and a runner 88.

Figure 4:
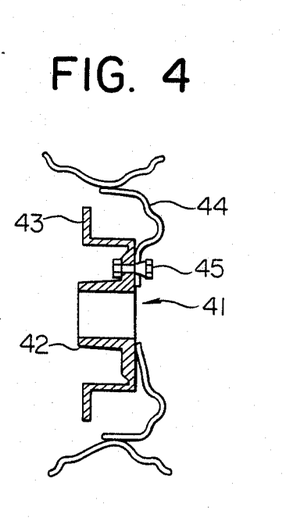
FIG. 4 is a cross-sectional view of a brake rotor bolted to a wheel according to a still further embodiment of the present invention.
Figure 9:
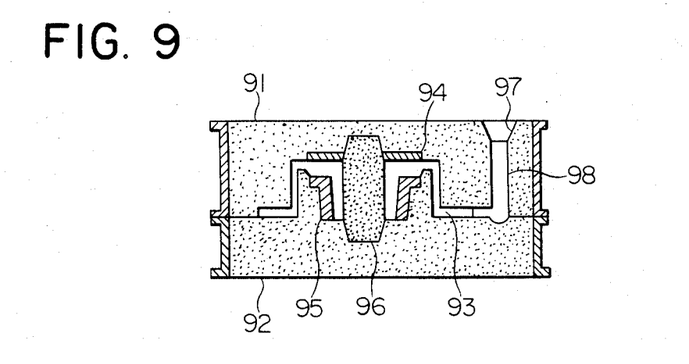
FIG. 9 is a cross-sectional view of a sand mold having chillers embedded therein for producing a brake rotor according to a still further embodiment of the present invention.

FIG. 9 shows a sand mold for producing a brake rotor typically indicated by FIG. 4. Similarly to FIG. 8, the sand mold of FIG. 9 consists of an upper mold part 91 and a lower mold part 92, which provides a cavity 93 when combined. Chillers 94, 95 are embedded in the mold near a cavity area for the hub portion, and a core 96 is placed at the center of the cavity 93. Also, the cavity 93 is provided with an opening 97 and a runner 98.

A melt of the hyper-eutectic flaky graphite cast iron is poured into a cavity of a sand mold provided with one or more chillers in the desired cavity area. Since the chiller is made of a metal having a high thermal conductivity, the melt is solidified more rapidly in the cavity area facing the chiller than in the other cavity area with no chiller. Accordingly, the hub portion can have a finer microstructure because of contact with the chiller placed nearby. It has been found that the rapid solidification of the hyper-eutectic flaky graphite cast iron melt imparts higher hardness and toughness to the resulting castings. Therefore, with the mold provided with one or more chillers in the desired cavity area for the hub portion, the brake member of the present invention integrally composed of a good combination of a sliding portion and a hub portion can be produced from a single melt of the hyper-eutectic flaky graphite cast iron.

To improve the mechanical properties of the cast brake member, it can be heat treated. The heat-treatment of the present invention comprises the steps of heating the as-cast product at a temperature at which eutectic cementite is decomposed, and cooling it from a temperature range in which the matrix is austenite at a cooling rate of 100°–300° C./min. The eutectic cementite is formed mainly in the rapidly cooled portion of the brake member casting, so the first step of this heat treatment is to improve the mechanical properties of such portion by decomposing the eutectic cementite to graphite. The heating temperature is usually 900°–950° C. and preferably 920°–930° C., and the heating time is usually 2–6 hours and preferably 3–5 hours.

The second step of this heat treatment is to reduce the percentage of a ferrite structure in the matrix of the flaky graphite cast iron. For instance, in the case of flaky graphite cast iron having HB of 130 or so, ferrite occupies about 40% of the matrix. Since the ferrite is too soft to withstand abrasion with a brake shoe or pad, the proportion of the ferrite should be reduced. For this purpose, cooling at a rate of 100°–300° C./min. is effective. The effective cooling rate is 150°–250° C./min. By this rapid cooling, the sliding portion of the heat-treated brake member casting has less than 40% of ferrite proportion which ensures enough wear resistance.

The present invention will be explained in further detail by the following Examples without intention of restricting the scope of the present invention.

EXAMPLE 1

With the molds ($CO_2$ molds) as shown in FIGS. 6 and 7, casting was carried out using a hyper-eutectic flaky graphite cast iron melt having the following composition:

| | |
|---|---|
| C | 3.65 wt. % |
| Si | 2.68 wt. % |
| Mn | 0.73 wt. % |
| P | 0.027 wt. % |
| S | 0.092 wt. % |
| Cr | 0.04 wt. % |
| Cu | 0.69 wt. % |

The balance was Fe and inevitable impurities. Incidentally, the chiller was as thick as the hub portion; 17 mm in FIG. 6 and 13 mm in FIG. 7.

The above melt was inoculated with 0.3% of Ca-Si immediately before pouring. The resulting brake drum and brake rotor castings had as-cast hardness shown in Table 2.

TABLE 2

| | Hub Portion | Sliding Portion (HB) |
|---|---|---|
| Drum | 219 | 133 |
| Rotor | 226 | 133 |

Figure 10:
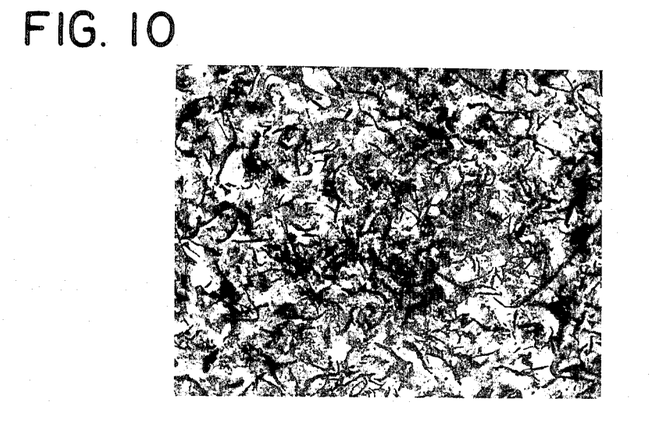
FIG. 10 is a photomicrograph (x50) of a hub portion of the brake rotor (as cast) in Example 1.
Figure 11:
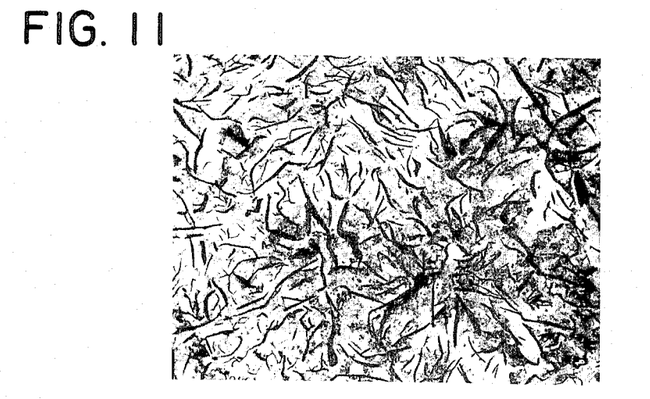
FIG. 11 is a photomicrograph (x50) of a disc portion of the brake rotor (as cast) in Example 1.

The microscopic structure (as cast) of the hub portion of the resulting brake rotor is shown in FIG. 10, and the microscopic structure (as cast) of the sliding portion of the resulting brake rotor in FIG. 11. Incidentally, the brake drum had substantially the same structure as the brake rotor.

As is apparent from Table 2, the hub portion has as high hardness as FC25, which hardness is high enough to resist yielding and breakage at bolt holes. And the sliding portion has low hardness corresponding to that of the hyper-eutectic flaky graphite cast iron which has a good damping capacity.

FIG. 10 shows the microstructure containing finer graphite particles due to rapid solidification and cooling by the chiller, which has hardness on the same level as that of FC25. On the other hand, FIG. 11 shows the hyper-eutectic flaky graphite cast iron structure in which graphite flakes have grown fully.

EXAMPLE 2

This Example shows the experiment of a brake rotor.

The $CO_2$ mold of FIG. 7 was used with a chiller of 39 mm in thickness, three times as thick as one used in Example 1. A melt of the following composition was used:

| | |
|---|---|
| C | 4.10 wt. % |
| Si | 1.13 wt. % |
| Mn | 0.37 wt. % |
| P | 0.028 wt. % |
| S | 0.102 wt. % |
| Cr | 0.04 wt. % |
| Cu | 0.61 wt. % |
| Fe and Impurities | Bal. |

Figure 12:
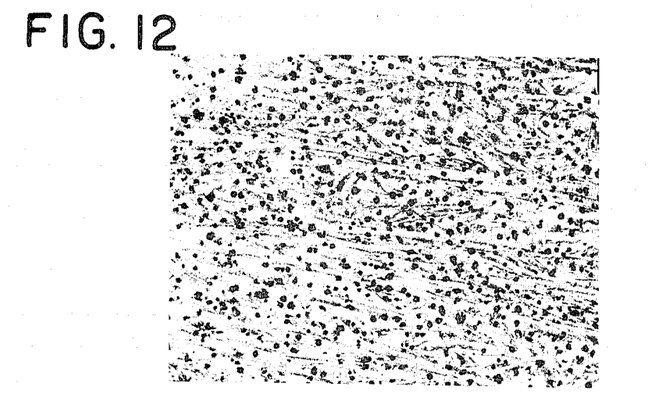
FIG. 12 is a photomicrograph (x100) of a hub portion of the brake rotor (as cast) in Example 2.

The melt was poured into the mold cavity without using any inoculant. FIG. 12 shows the microstructure of the hub portion of the resulting as-cast brake rotor.

The brake rotor was then heated at 920° C. for 3 hours, cooled to 820° C. in a furnace and kept at that temperature for 1 hour and then let to be cooled.

The heat-treated brake rotor had hardness shown in Table 3.

TABLE 3

| | Hub Portion | Sliding Portion (HB) |
|---|---|---|
| Rotor | 231 | 142 |

Figure 13:
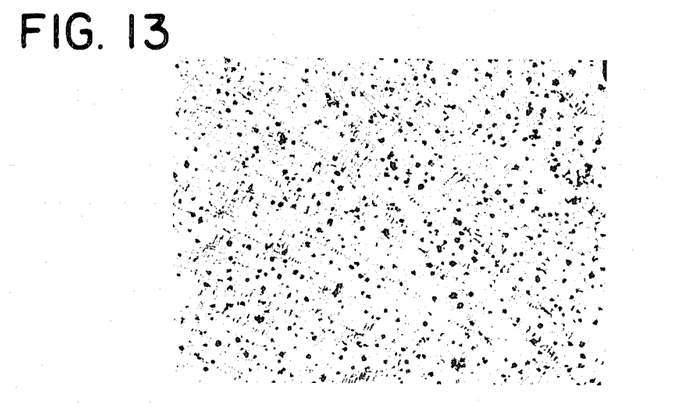
FIG. 13 is a photomicrograph (x100) of a hub portion of the brake rotor after heat treatment in Example 2.
Figure 14:
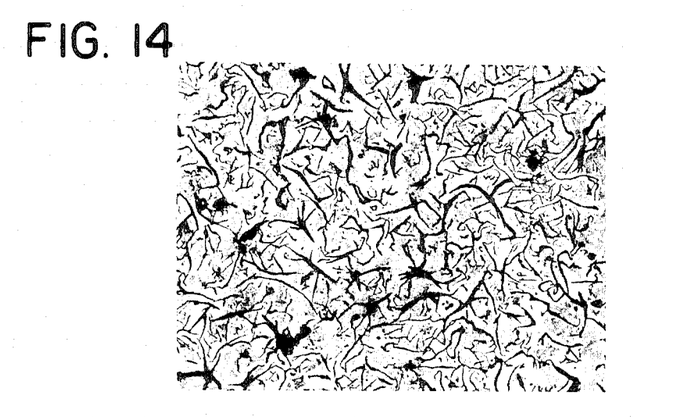
FIG. 14 is a photomicrograph (x50) of a disc portion of the brake rotor after heat treatment in Example 2.

FIG. 13 shows the microstructure of the hub portion of the brake rotor after heat treatment, and FIG. 14 shows the microstructure of the sliding portion of the same brake rotor.

This Example verifies that although the use of a thicker chiller results in the precipitation of more cementite, making the hub portion more vulnerable to breakage, the above heat treatment serves to decompose cementite to form graphite particles in the hub portion, thus increasing the hardness to HB231. Therefore, the heat-treated brake rotor was improved in yield and abrasion resistance as compared with the as-cast brake rotor in Example 1.

As for the sliding portion, no change took place with respect to the shape and amount of graphite flakes in the microstructure, and the hardness was HB142 satisfying the damping capacity requirement. Thus, it may be concluded that the sliding portion had a hyper-eutectic flaky graphite cast iron structure.

Incidentally, the hardness may be adjusted desirably by controlling the cooling conditions such as a temperature and a cooling rate.

EXAMPLE 3

Example 1 was repeated except for using the $CO_2$ mold of FIGS. 8 and 9 with chillers of the same thickness as in Example 1, and using a melt of the following composition:

| | |
|---|---|
| C | 3.66 wt. % |
| Si | 2.58 wt. % |
| Mn | 0.72 wt. % |
| P | 0.026 wt. % |
| S | 0.091 wt. % |
| Cr | 0.03 wt. % |
| Cu | 0.68 wt. % |
| Fe and Impurities | Bal. |

The resulting brake members had hardness shown in Table 4 below.

TABLE 4

| | Hub Portion | Sliding Portion (HB) |
|---|---|---|
| Brake Drum | 217 | 131 |
| Brake Rotor | 223 | 131 |

Figure 15:
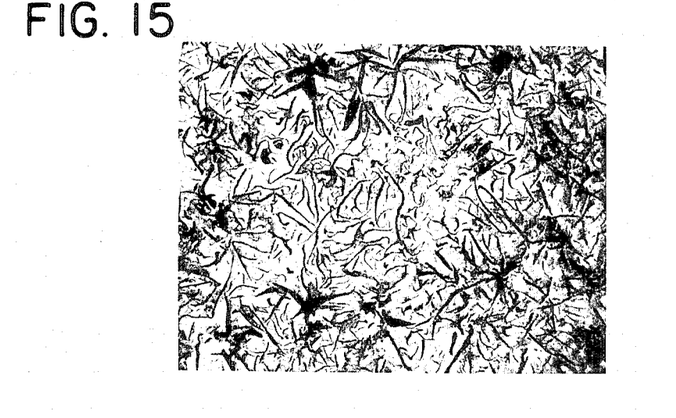
FIG. 15 is a photomicrograph (x50) of a hub portion of the brake rotor (as cast) in Example 3.
Figure 16:
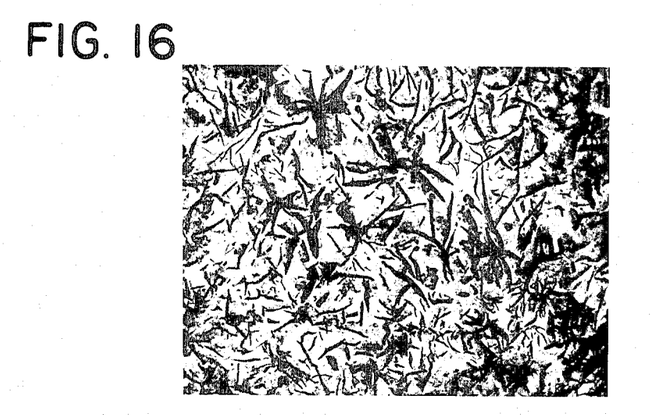
FIG. 16 is a photomicrograph (x50) of a disc portion of the brake rotor (as cast) in Example 3.

FIG. 15 shows the microstructure of the hub portion of the as-cast brake rotor, and FIG. 16 shows the microstructure of the sliding portion of the as-cast brake rotor. Incidentally, the brake drum had substantially the same microstructure as the brake rotor.

Similarly to Example 1, Table 4 shows that the hub portion had as high hardness as FC25, which hardness is high enough to resist yielding and breakage at bolt holes. And the sliding portion had low hardness corresponding to that of the hyper-eutectic flaky graphite cast iron which has a good damping capacity.

FIG. 15 shows the microstructure containing finer graphite particles due to rapid solidification and cooling by the chiller, which has hardness on the same level as that of FC25. On the other hand, FIG. 16 shows the hyper-eutectic flaky graphite cast iron structure in which graphite flakes have grown fully.

EXAMPLE 4

This Example shows the experiment of a brake rotor as in Example 2.

The $CO_2$ mold of FIG. 9 was used with a chiller of 39 mm in thickness, three times as thick as one used in Example 1. A melt of the following composition was used:

| | |
|---|---|
| C | 4.11 wt. % |
| Si | 1.14 wt. % |
| Mn | 0.36 wt. % |
| P | 0.028 wt. % |
| S | 0.101 wt. % |
| Cr | 0.05 wt. % |
| Cu | 0.62 wt. % |
| Fe and Impurities | Bal. |

Figure 17:
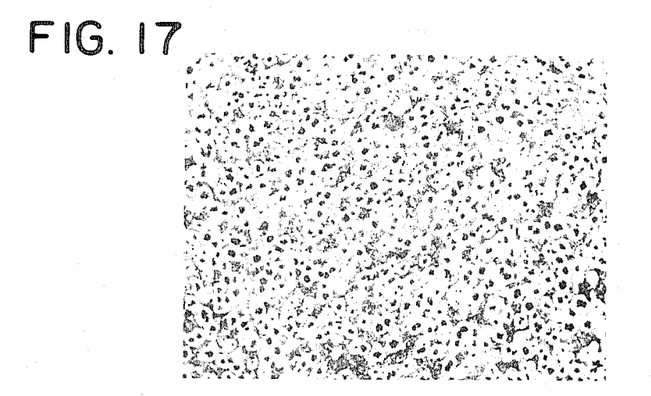
FIG. 17 is a photomicrograph (x100) of a hub portion of the brake rotor (as cast) in Example 4.

The melt was poured into the mold cavity without using any inoculant. FIG. 17 shows the microstructure of the hub portion of the resulting as-cast brake rotor.

The brake rotor was then heated at 920° C. for 3 hours, cooled to 820° C. in a furnace and kept at that temperature for 1 hour and then let to be cooled.

The heat-treated brake rotor had hardness shown in Table 5.

TABLE 5

| | Hub Portion | Sliding Portion (HB) |
|---|---|---|
| Rotor | 235 | 143 |

Figure 18:
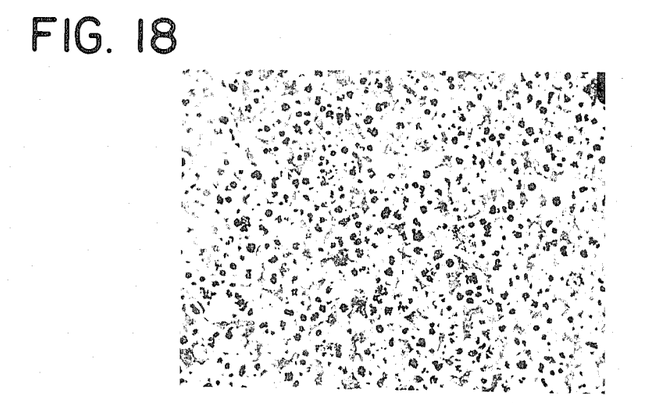
FIG. 18 is a photomicrograph (x100) of a hub portion of the brake rotor after heat treatment in Example 4.
Figure 19:
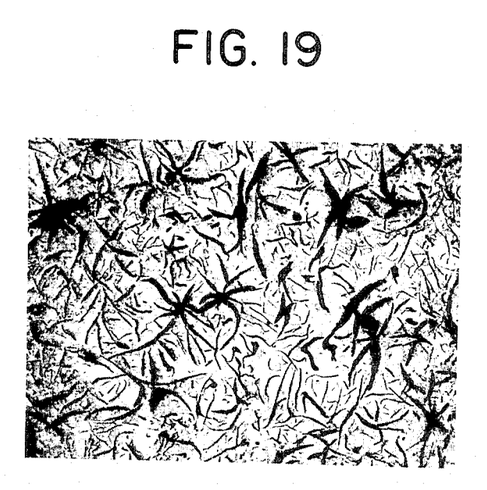
FIG. 19 is a photomicrograph (x50) of a disc portion of the brake rotor after heat treatment in Example 4.

FIG. 18 shows the microstructure of the hub portion of the brake rotor after heat treatment, and FIG. 19 shows the microstructure of the sliding portion of the same brake rotor.

The above heat treatment served to decompose cementite to form graphite particles in the hub portion, thus increasing the hardness to HB235. Therefore, the heat-treated brake rotor was improved in yield and abrasion resistance as compared with the as-cast brake rotor in Example 3.

As for the sliding portion, no change took place with respect to the shape and amount of graphite flakes in the microstructure, and the hardness was HB143 satisfying the damping capacity requirement. Thus, it may be concluded that the sliding portion had a hyper-eutectic flaky graphite cast iron structure.

As described above, since the brake member of the present invention is integrally composed of a sliding portion with good damping capacity and wear resistance and a hub portion with good mechanical strength, it can enjoy excellent braking performance with a long life. Also, since it can be produced from a single melt by using a sand mold having one or more chillers embedded therein, the production process thereof is extremely easy and less costly.

What is claimed is:

1. A brake member integrally cast from a single melt of a hyper-eutectic flaky graphite cast iron having an equivalent carbon content of greater than about 4.3% and composed of a sliding portion and a hub portion, said sliding portion having a flaky graphite cast iron microstructure with a good damping capacity and said hub portion comprising a rapidly solidified high-strength cast iron with a microstructure containing finer graphite particles than those in said flaky graphite cast iron.

2. The brake member according to claim 1, wherein said sliding portion is a drum portion.

3. The brake member according to claim 1, wherein said flaky graphite cast iron has a damping capacity $Q^{-1}$ of higher than $16 \times 10^{-1}$.

4. The brake member according to claim 1, wherein said hyper-eutectic flaky graphite cast iron has a composition of 3.50–4.20% of C, 1.00–3.00% of Si, 0.30–0.80% of Mn, less than 0.10% of P, less than 0.12% of S, 0.01–0.08% of Cr, 0.20–0.80% of Cu and balance Fe and inevitable impurities on a weight basis.

5. The brake member as in claim 1 wherein said sliding member is a rotor portion.

6. The brake member as in claim 1 wherein the proportion of ferrite structure in said sliding portion flaky grapite cast iron microstructure is less than about 40%.

7. A method of manufacturing a brake member integrally composed of a sliding portion and a hub portion, said sliding portion having a flaky graphite cast iron microstructure with a good damping capacity and said hub portion having a high-strength cast iron microstructure, comprising the step of pouring a melt having a hyper-eutectic flaky graphite cast iron composition into a cavity of a sand mold in which a chiller is embedded adjacent to a cavity region for said hub portion.

8. The brake member produced by the process of claim 7.

9. The method of manufacturing a brake member according to claim 7, further comprising the steps of heating the resulting brake member casting at a temperature at which eutectic cementite is decomposed, and cooling it from a temperature range in which the matrix thereof is austenite at a cooling rate of 100°–300° C./min.

10. The brake member produced by the process of claim 9.

11. The method of manufacturing a brake member according to claim 9, wherein the heating temperature of said brake member casting is 900°–950° C.

12. The brake member produced by the process of claim 11.

13. The method of manufacturing a brake member according to claim 11, wherein said temperature range in which the matrix is austenite is 800°–850° C.

14. The brake member produced by the process of claim 13.

15. The method of manufacturing a brake member according to claim 13, wherein said brake member casting is left to stand in the atmosphere so that it is cooled spontaneously from said temperature range of 800°–850° C.

16. The brake member produced by the process of claim 15.

* * * * *

UNITED STATES PATENT AND TRADEMARK OFFICE
CERTIFICATE OF CORRECTION

PATENT NO. : 4,807,728

DATED : February 28, 1989

INVENTOR(S) : MAKOTO SUENAGA ET AL.

It is certified that error appears in the above-identified patent and that said Letters Patent is hereby corrected as shown below:

Claim 3, column 8, line 65, delete "$10^{-1}$" and substitute therefor --$10^{-3}$--.

Signed and Sealed this

Eighth Day of August, 1989

Attest:

DONALD J. QUIGG

*Attesting Officer*    *Commissioner of Patents and Trademarks*